United States Patent
Yamamoto

(10) Patent No.: US 9,753,261 B2
(45) Date of Patent: Sep. 5, 2017

(54) PROJECTION LENS AND PROJECTION-TYPE DISPLAY APPARATUS

(71) Applicant: FUJIFILM Corporation, Tokyo (JP)

(72) Inventor: Chikara Yamamoto, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 327 days.

(21) Appl. No.: 14/660,963

(22) Filed: Mar. 18, 2015

(65) Prior Publication Data
US 2015/0268455 A1    Sep. 24, 2015

(30) Foreign Application Priority Data

Mar. 20, 2014 (JP) .................. 2014-057760

(51) Int. Cl.
*G02B 3/00* (2006.01)
*G02B 9/00* (2006.01)
*G02B 13/16* (2006.01)
*G02B 13/02* (2006.01)

(52) U.S. Cl.
CPC ............ *G02B 13/16* (2013.01); *G02B 13/02* (2013.01)

(58) Field of Classification Search
CPC ...... G02B 13/16; G02B 15/177; G02B 13/18; G02B 13/143; G02B 13/04; G02B 13/22
USPC .............. 359/641, 648, 650, 672–706, 649
See application file for complete search history.

(56) References Cited

U.S. PATENT DOCUMENTS

| | | |
|---|---|---|
| 7,911,716 B1 | 3/2011 | Lu et al. |
| 8,254,033 B2 | 8/2012 | Huang et al. |
| 8,587,872 B2 | 11/2013 | Lai et al. |

FOREIGN PATENT DOCUMENTS

| | | |
|---|---|---|
| JP | 2003-202492 | 7/2003 |
| JP | 4552446 | 9/2010 |
| JP | 2011-075633 | 4/2011 |
| JP | 4689212 | 5/2011 |

OTHER PUBLICATIONS

Search Report from German Patent Office dated Nov. 5, 2015; File No. 10 2015 103 707.6.

*Primary Examiner* — Bumsuk Won
*Assistant Examiner* — Tamara Y Washington
(74) *Attorney, Agent, or Firm* — Young & Thompson

(57) ABSTRACT

A projection lens consists essentially of a first lens group having positive refractive power and a second lens group having positive refractive power in this order from a magnification side. A surface closest to a reduction side in the first lens group is convex. The second lens group consists of two single lenses each having positive refractive power, and in each of which a surface having a smaller absolute value faces the reduction side. Further, the following conditional expressions (1) through (4) are satisfied:

$|R1b/R1f| \leq 0.5$        (1);

$|R2b/R2f| \leq 0.6$        (2);

$|\Delta/f2| \leq 0.3$        (3) and $d2/f2 \leq 0.4$        (4).

15 Claims, 5 Drawing Sheets

EXAMPLE 1

←—magnification side      reduction side—→

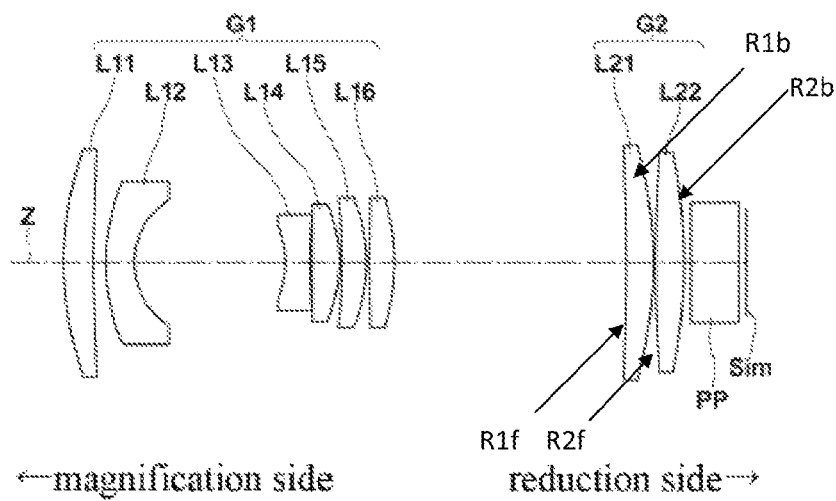
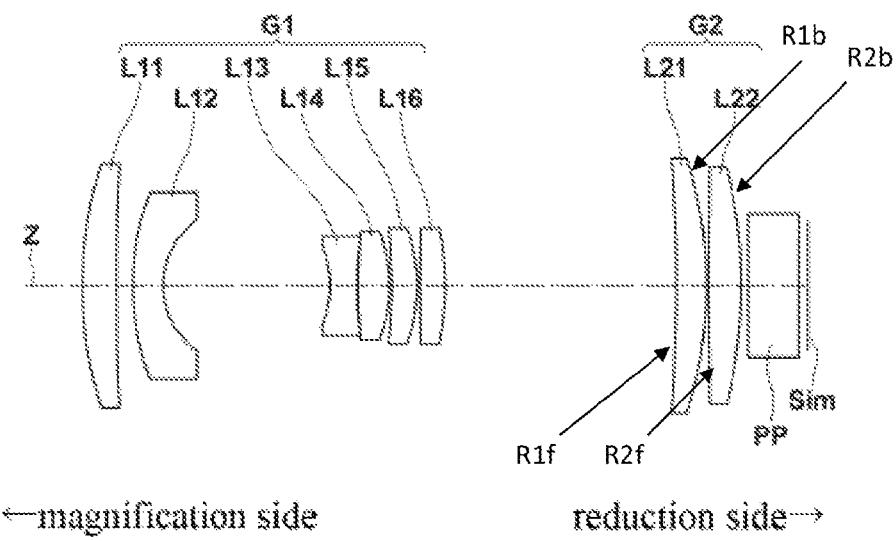

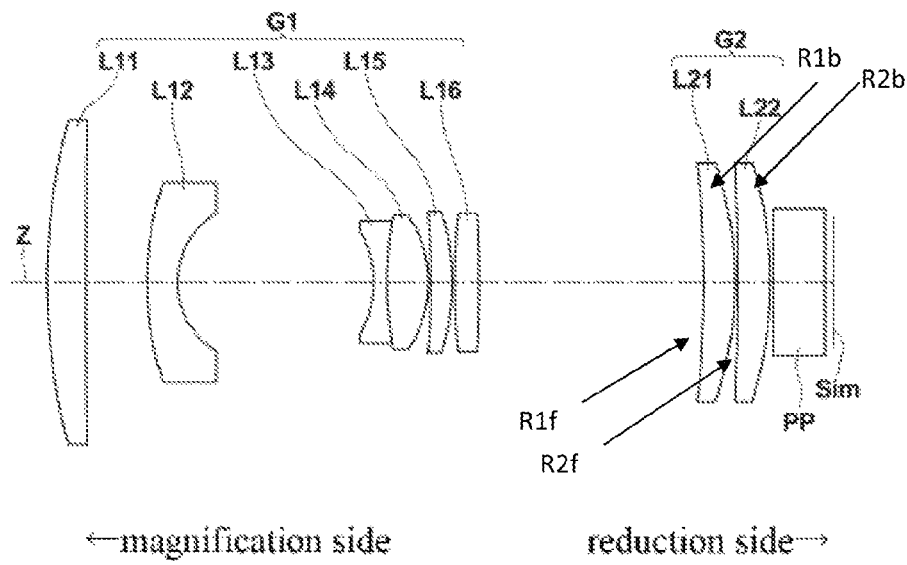
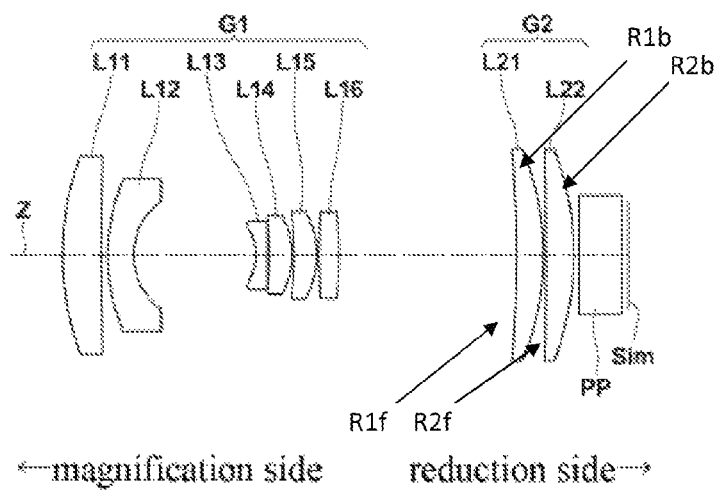

EXAMPLE 1

EXAMPLE 2

PROJECTION LENS AND PROJECTION-TYPE DISPLAY APPARATUS

CROSS-REFERENCE TO RELATED APPLICATIONS

The present application claims priority under 35 U.S.C. §119 to Japanese Patent Application No. 2014-057760, filed on Mar. 20, 2014. The above application is hereby expressly incorporated by reference, in its entirety, into the present application.

BACKGROUND OF THE INVENTION

Field of the Invention

The present invention relates to a projection-type display apparatus using a reflective light valve, especially, a DMD in which micromirrors are arranged to perform modulation by deflection of light by the micromirrors and a projection lens used in this projection-type display apparatus.

Description of the Related Art

A market of projectors greatly expanded in recent years as personal computers became widely used. As light valves (light modulation devices) used in these projectors, transmissive or reflective liquid crystal display devices, a DMD (Digital Micromirror Device) device, in which micromirrors are regularly arranged, and the like are known. Especially, the DMD device using micromirrors is appropriate to reduce the size of a projector, because the DMD device has a high response speed, and the projector is structurable in such a manner that illumination light of each of RGB is sequentially output to a single-panel light valve by time division.

In projectors, basically three types of optical system using a DMD device, as a light valve, are known. The first type separates rays of illumination light and rays of projection light from each other by using a total reflection prism. However, since the total reflection prism is used, there is a problem that the size of the apparatus becomes large, and the cost increases. In the second type, an entrance pupil is positioned toward the reduction side in a projection lens, and rays of illumination light and rays of projection light are separated from each other by greatly shifting the projection lens with respect to a light valve. However, since separation of rays of illumination light and rays of projection light is imperfect, illumination becomes uneven. Further, there is a problem that a pupil toward the magnification side is not positioned symmetrically with respect to the center of a projection image.

Therefore, when the size of a projector is tried to be reduced, the third type is desirable. In the third type, illumination light and projection light are separated from each other by arranging a field lens in the vicinity of a light valve. As projection lenses configured in this manner, lenses disclosed in Specification of Japanese Patent No. 4689212 (Patent Document 1), Specification of U.S. Pat. No. 8,254,033 (Patent Document 2), Specification of U.S. Pat. No. 7,911,716 (Patent Document 3), Japanese Unexamined Patent Publication No. 2003-202492 (Patent Document 4), Japanese Unexamined Patent Publication No. 2011-075633 (Patent Document 5), Specification of Japanese Patent No. 4552446 (Patent Document 6), Specification of U.S. Pat. No. 8,587,872 (Patent Document 7) are known.

SUMMARY OF THE INVENTION

Meanwhile, the type of separating rays of illumination light and rays of projection light from each other by a field lens has a problem that stray light by the field lens tends to be generated, and also a problem that curvature of field occurs when reduction in size is achieved by reduction in the focal length of the field lens.

In the projection lenses disclosed in Patent Documents 1 through 3, stray light by a field lens is not taken into consideration. Therefore, stray light with high intensity is generated. In the projection lenses disclosed in Patent Documents 4 and 5, stray light is taken into consideration. However, reduction in size is not considered. In the projection lenses disclosed in Patent Documents 6 and 7, neither measures against stray light nor measures for reducing the size of an apparatus while also considering separation of rays of illumination light and rays of projection light from each other are proposed.

In view of the foregoing circumstances, it is an object of the present invention to provide a projection lens in which stray light is small, and curvature of field is also small while the size of the projection lens is small, and also a projection-type display apparatus including the projection lens.

A projection lens of the present invention consists essentially of a first lens group having positive refractive power and a second lens group having positive refractive power in this order from a magnification side. A surface closest to a reduction side in the first lens group is convex. The second lens group consists of two single lenses each having positive refractive power, and in each of which a surface having a smaller absolute value of a curvature radius faces the reduction side. Further, the following conditional expressions (1) through (4) are satisfied:

$$|R1b/R1f| \le 0.5 \tag{1};$$

$$|R2b/R2f| \le 0.6 \tag{2};$$

$$|\Delta/f2| \le 0.3 \tag{3); and}$$

$$d2/f2 \le 0.4 \tag{4), where}$$

R1b: a curvature radius of a reduction-side surface of the positive lens located toward the magnification side in the second lens group, R1f: a curvature radius of a magnification-side surface of the positive lens located toward the magnification side in the second lens group, R2b: a curvature radius of a reduction-side surface of the positive lens located toward the reduction side in the second lens group, R2f: a curvature radius of a magnification-side surface of the positive lens located toward the reduction side in the second lens group, Δ: a distance between a lens surface closest to the reduction side in the first lens group and a magnification-side focal position of the second lens group, f2: a focal length of the whole second lens group, and d2: the total length of the second lens group (a distance on an optical axis from a lens surface closest to the magnification side in the second lens group to a lens surface closest to the reduction side in the second lens group).

It is desirable that the projection lens of the present invention satisfies the following conditional expressions (5) and (6):

$$0.0 \le R1b/R1f \le 0.5 \tag{5); and}$$

$$-0.6 \le R2b/R2f \le 0.4 \tag{6).}$$

Further, it is desirable that the following conditional expression (7) is satisfied:

$$R1f/R2f \leq 0.6 \qquad (7).$$

Further, it is desirable that the following conditional expression (8) is satisfied:

$$0.9 \leq f2/f \leq 3.5 \qquad (8),$$ where f: a focal length of an entire system.

Further, it is desirable that the following conditional expression (9) is satisfied:

$$0.2 \leq dd/l \leq 0.5 \qquad (9),$$ where dd: a distance between the first lens group and the second lens group, and l: the total length of an entire system (a distance on an optical axis from a lens surface closest to the magnification side in the first lens group to a lens surface closest to the reduction side in the second lens group).

Further, it is desirable that the following conditional expression (10) is satisfied:

$$Bf/f \leq 0.35 \qquad (10),$$ where

Bf: a back focus of an entire system, and f: a focal length of the entire system.

Further, it is desirable that the refractive index of each of the two lenses constituting the second lens group satisfies the following conditional expression (11):

$$1.7 \leq N2 \qquad (11),$$ where

N2: a refractive index of each of the lenses constituting the second lens group.

Further, it is desirable that the first lens group consists essentially of a first lens having positive refractive power, a second lens having negative refractive power, a third lens having negative refractive power, a fourth lens having positive refractive power, a fifth lens having positive refractive power and a sixth lens having positive refractive power in this order from the magnification side.

In this case, the third lens and the fourth lens may be cemented together.

Further, it is desirable that the following conditional expression (4-1) is satisfied:

$$d2/f2 \leq 0.3 \qquad (4\text{-}1).$$

Further, it is desirable that the following conditional expression (5-1) is satisfied:

$$0.1 \leq R1b/R1f \leq 0.5 \qquad (5\text{-}1).$$

Further, it is desirable that the following conditional expression (6-1) is satisfied:

$$-0.5 \leq R2b/R2f \leq 0.3 \qquad (6\text{-}1).$$

Further, it is desirable that the following conditional expression (7-1) is satisfied:

$$-3.0 \leq R1f/R2f \leq 0.5 \qquad (7\text{-}1).$$

Further, it is desirable that the following conditional expression (8-1) is satisfied:

$$1.2 \leq f2/f \leq 3.0 \qquad (8\text{-}1).$$

A projection-type display apparatus of the present invention includes a light source, a light valve, which light from the light source enters, and the projection lens of the present invention as described above, as a projection lens that projects an optical image formed by light that has been optically modulated by the light valve onto a screen. Further, the projection-type display apparatus is configured in such a manner that also the light entering the light valve passes through the second lens group before the light enters the light valve.

Here, the expression "consists essentially of" means that lenses essentially without any refractive power, optical elements, such as a stop, a mask, a cover glass and a filter, other than lenses, mechanical parts, such as a lens flange, a lens barrel, an imaging device and a hand shake blur correction mechanism, and the like may be included besides the elements mentioned as composition elements.

Further, the surface shape of the lenses and the sign of refractive power are considered in a paraxial region when an aspheric surface is included.

The projection lens of the present invention consists essentially of a first lens group having positive refractive power and a second lens group having positive refractive power in this order from a magnification side, Further, a surface closest to a reduction side in the first lens group is convex. Further, the second lens group consists of two single lenses each having positive refractive power, and in each of which a surface having a smaller absolute value of a curvature radius faces the reduction side. Further, the following conditional expressions (1) through (4) are satisfied. Therefore, it is possible to provide a projection lens in which stray light is small, and curvature of field is also small while the size of the projection lens is small.

$$|R1b/R1f| \leq 0.5 \qquad (1);$$

$$|R2b/R2f| \leq 0.6 \qquad (2);$$

$$|\Delta/f2| \leq 0.3 \qquad (3); \text{ and}$$

$$d2/f2 \leq 0.4 \qquad (4).$$

The projection-type display apparatus of the present invention includes the projection lens of the present invention. Therefore, high-image-quality images are obtainable in which stray light is small and curvature of field is also small while the size of the apparatus is small.

BRIEF DESCRIPTION OF THE DRAWINGS

FIG. 1 is a cross section illustrating the lens configuration of a projection lens according to an embodiment of the present invention (also Example 1);

FIG. 2 is a cross section illustrating the lens configuration of a projection lens in Example 2 of the present invention;

FIG. 3 is a cross section illustrating the lens configuration of a projection lens in Example 3 of the present invention;

FIG. 4 is a cross section illustrating the lens configuration of a projection lens in Example 4 of the present invention;

DESCRIPTION OF THE PREFERRED EMBODIMENTS

Figure 5:
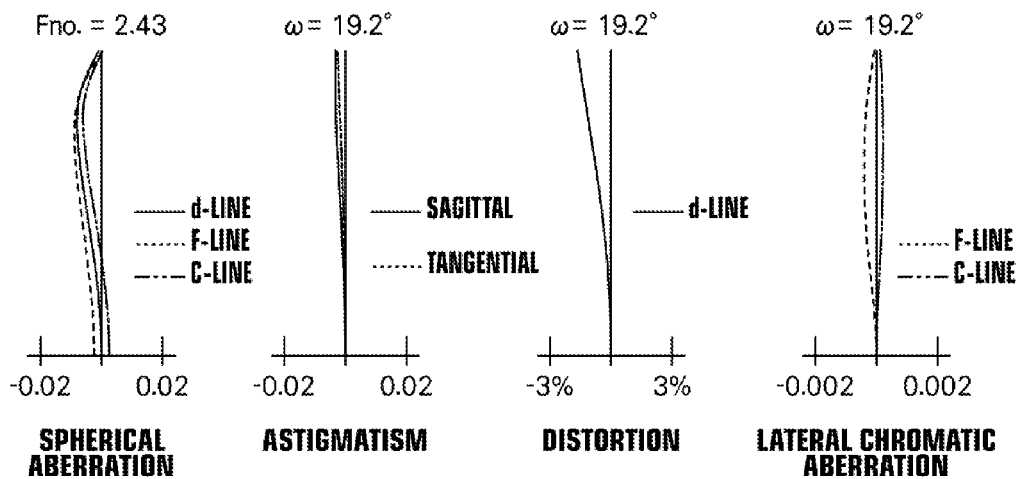
FIG. 5 is aberration diagrams of the projection lens in Example 1 of the present invention.

Next, embodiments of the present invention will be described in detail with reference to drawings. FIG. 1 is a cross section illustrating the lens configuration of a projection lens according to an embodiment of the present invention. The example of configuration illustrated in FIG. 1 is also the configuration of a projection lens in Example 1, which will be described later.

This projection lens may be mounted, for example, in a projection-type display apparatus, and is usable as a projection lens that projects image information displayed on a light valve onto a screen. In FIG. 1, the left side of the diagram is a magnification side, and the right side of the diagram is a reduction side. A case of mounting the projection lens in the projection-type display apparatus is considered, and parallel-flat-plate-shaped optical member PP, which is assumed to be various filters, a cover glass or the like, and image display plane Sim of a light valve are also illustrated.

In the projection-type display apparatus, image information is given to rays at image display plane Sim, and the rays enter this projection lens through optical member PP. Further, the rays are projected by this projection lens onto a screen (not illustrated) arranged in a left-side direction of the sheet surface.

As illustrated in FIG. 1, this projection lens consists of first lens group G1 having positive refractive power and second lens group G2 having positive refractive power in this order from the magnification side. Further, a surface closest to a reduction side in first lens group G1 is convex. Further, second lens group G2 consists of two single lenses (L21, L22) each having positive refractive power, and in each of which a surface having a smaller absolute value of a curvature radius faces the reduction side.

Since the surface closest to the reduction side in first lens group G1 is convex, as described above, it is possible to secure a space between first lens group G1 and second lens group G2 while the whole lens is made compact. Therefore, it is possible to easily provide a space for separating rays of illumination light and rays of projection light from each other.

Further, when second lens group G2, which functions as a field lens, consists of two lenses L21, L22, it is possible to distribute refractive power to the lenses, compared with a case in which second lens group G2 consists of only one positive lens. Therefore, it is possible to reduce curvature of field.

Here, the projection lens according to an embodiment of the present invention assumes a case in which rays from a light source provided in a projection-type display apparatus enter a light valve after the rays are passed through second lens group G2, which functions as a field lens. If this second lens group G2 includes a convex surface having strong refractive power, especially, as a surface facing first lens group G1, rays from the light source may be reflected at this convex surface, and enter first lens group G1, and become stray light. Therefore, when each of these lenses L21, L22 has positive refractive power, and a surface having a smaller absolute value of a curvature radius in each of lenses L21, L22 faces the reduction side, and the refractive power of the convex surface toward first lens group G1 of each of the lenses is reduced, it is possible to reduce stray light.

In second lens group G2, it is desirable that a surface closest to first lens group G1 is concave. When the lens is configured in this manner, it is possible to further reduce stray light.

Further, this projection lens is configured in such a manner that the following conditional expressions (1) through (4) are satisfied. When conditional expression (1) is satisfied, it is possible to provide a projection lens in which stray light is small and curvature of field is also small. When conditional expression (2) is satisfied, it is possible to provide a projection lens in which stray light is small and curvature of field is also small. When conditional expression (3) is satisfied, it is possible to easily separate rays of illumination light and rays of projection light from each other. Therefore, it is possible to provide a bright projection lens having a small F-number. When conditional expression (4) is satisfied, it is possible to suppress an increase in the size of second lens group G2 in the diameter direction, and to reduce the size of the projection lens. Here, when the following conditional expression (4-1) is satisfied, more excellent characteristics are achievable:

$$|R1b/R1f| \leq 0.5 \qquad (1);$$

$$|R2b/R2f| \leq 0.6 \qquad (2);$$

$$|\Delta/f2| \leq 0.3 \qquad (3);$$

$$d2/f2 \leq 0.4 \qquad (4); \text{ and}$$

$$d2/f2 \leq 0.3 \qquad (4\text{-}1), \text{ where}$$

R1b: a curvature radius of a reduction-side surface of the positive lens located toward the magnification side in the second lens group, R1f: a curvature radius of a magnification-side surface of the positive lens located toward the magnification side in the second lens group, R2b: a curvature radius of a reduction-side surface of the positive lens located toward the reduction side in the second lens group, R2f: a curvature radius of a magnification-side surface of the positive lens located toward the reduction side in the second lens group, Δ: a distance between a lens surface closest to the reduction side in the first lens group and a magnification-side focal position of the second lens group, f2: a focal length of the whole second lens group, and d2: the total length of the second lens group (a distance on an optical axis from a lens surface closest to the magnification side in the second lens group to a lens surface closest to the reduction side in the second lens group).

In the projection lens according to an embodiment of the present invention, it is desirable that the following conditional expressions (5) and (6) are satisfied. When conditional expression (5) is satisfied, it is possible to provide a projection lens in which stray light is small and curvature of field is also small. When conditional expression (6) is satisfied, it is possible to provide a projection lens in which stray light is small and curvature of field is also small. When one of the following conditional expressions (5-1) and (6-1), and desirably both of them are satisfied, more excellent characteristics are achievable:

$$0.0 \leq R1b/R1f \leq 0.5 \qquad (5);$$

$$-0.6 \leq R2b/R2f \leq 0.4 \qquad (6);$$

$$0.1 \leq R1b/R1f \leq 0.5 \qquad (5\text{-}1); \text{ and}$$

$$-0.5 \leq R2b/R2f \leq 0.3 \qquad (6\text{-}1), \text{ where}$$

R1b: a curvature radius of a reduction-side surface of the positive lens located toward the magnification side in the second lens group, R1f: a curvature radius of a magnification-side surface of the positive lens located toward the magnification side in the second lens group, R2b: a curvature radius of a reduction-side surface of the positive lens located toward the reduction side in the second lens group, and R2f: a curvature radius of a magnification-side surface of the positive lens located toward the reduction side in the second lens group.

Further, it is desirable that the following conditional expression (7) is satisfied. When conditional expression (7) is satisfied, it is possible to provide a projection lens in which curvature of field is small. Here, when the following conditional expression (7-1) is satisfied, more excellent characteristics are achievable:

$$R1f/R2f \leq 0.6 \quad (7); \text{ and}$$

$$-3.0 \leq R1f/R2f \leq 0.5 \quad (7\text{-}1), \text{ where}$$

R1f: a curvature radius of a magnification-side surface of the positive lens located toward the magnification side in the second lens group, and R2f: a curvature radius of a magnification-side surface of the positive lens located toward the reduction side in the second lens group.

Further, it is desirable that the following conditional expression (8) is satisfied. When the value is not lower than the lower limit of conditional expression (8), it is possible to provide a projection lens in which curvature of field is small. Further, when the value does not exceed the upper limit of conditional expression (8), it is possible to suppress an increase in the size of the projection lens, and to achieve reduction in the size of the projection lens. When the following conditional expression (8-1) is satisfied, more excellent characteristics are achievable:

$$0.9 \leq f2/f \leq 3.5 \quad (8); \text{ and}$$

$$1.2 \leq f2/f \leq 3.0 \quad (8\text{-}1), \text{ where}$$

f2: a focal length of the whole second lens group, and
f: a focal length of an entire system.

Further, it is desirable that the following conditional expression (9) is satisfied. When the value is not lower than the lower limit of conditional expression (9), it is possible to provide a projection lens in which curvature of field is small. Further, it is possible to easily separate rays of illumination light and rays of projection light from each other. Therefore, it is possible to provide a bright projection lens having a small F-number. Further, when the value does not exceed the upper limit of conditional expression (9), it is possible to suppress an increase in the size of the projection lens, and to achieve reduction in the size of the projection lens.

$$0.2 \leq dd/l \leq 0.5 \quad (9), \text{ where}$$

dd: a distance between the first lens group and the second lens group, and l: the total length of an entire system (a distance on an optical axis from a lens surface closest to the magnification side in the first lens group to a lens surface closest to the reduction side in the second lens group).

Further, it is desirable that the following conditional expression (10) is satisfied. When conditional expression (10) is satisfied, it is possible to suppress an increase in the size of second lens group G2 in the diameter direction, and to achieve reduction in the size of the projection lens.

$$Bf/f \leq 0.35 \quad (10), \text{ where}$$

Bf: a back focus of an entire system, and
f: a focal length of the entire system.

Further, it is desirable that the refractive index of each of the two lenses constituting second lens group G2 satisfies the following conditional expression (11). When conditional expression (11) is satisfied, it is possible to provide a projection lens in which curvature of field is small:

$$1.7 \leq N2 \quad (11), \text{ where}$$

N2: a refractive index of each lens constituting the second lens group.

Further, it is desirable that first lens group G1 consists of first lens L1 having positive refractive power, second lens L2 having negative refractive power, third lens L3 having negative refractive power, fourth lens L4 having positive refractive power, fifth lens L5 having positive refractive power, and sixth lens L6 having positive refractive power in this order from the magnification side. Especially, when first lens L1 is a positive lens, it is possible to provide a lens in which distortion is small, which is necessary as a projection lens.

In this case, third lens L3 and fourth lens L4 may be cemented together. When a cemented surface is arranged in this manner, that is effective to correct the tilt of an image plane and chromatic aberrations. Further, it is possible to reduce sensitivity to assembly during assembly of the lens.

Next, numerical value examples of the projection lens of the present invention will be described. First, a projection lens in Example 1 will be described. FIG. 1 is a cross section illustrating the lens configuration of the projection lens in Example 1. In FIG. 1 and FIGS. 2 through 4 corresponding to Examples 2 through 4, which will be described later, the left side is a magnification side, and the right side is a reduction side. Here, numerical values in the following Tables 1 through 5 and aberration diagrams of FIGS. 5 through 8 are normalized in such a manner that a focal length of an entire system focused on an object at infinity is 1.0.

Table 1 shows lens data of the projection lens in Example 1. In the following descriptions, the meanings of signs in tables will be described by using the table of Example 1, as an example. The meanings of signs in the tables of Examples 2 through 4 are similar to those of Example 1.

In the lens data of Table 1, a column of surface number shows the surface number of a surface when a surface of composition elements closest to the magnification side is the first surface and the surface numbers sequentially increase toward the reduction side. A column of curvature radius shows the curvature radius of each surface. A column of surface distance shows a distance, on optical axis Z, between each surface and its next surface. Further, a column of nd shows the refractive index of each optical element for d-line (wavelength is 587.6 nm). A column of νd shows the Abbe number of each optical element for d-line (wavelength is 587.6 nm). Here, the sign of a curvature radius is positive when a surface shape is convex toward the magnification side, and negative when a surface shape is convex toward the reduction side.

FIG. 5 illustrates aberration diagrams of the projection lens in Example 1. A spherical aberration, astigmatism, distortion and a lateral chromatic aberration are illustrated in this order from the left side of FIG. 5. The aberration diagrams illustrating a spherical aberration, astigmatism and distortion show aberrations when d-line (wavelength is 587.6 nm) is a reference wavelength. In the aberration diagram of the spherical aberration, aberrations for d-line (wavelength is 587.6 nm), C-line (wavelength is 656.3 nm) and F-line (wavelength is 486.1 nm) are indicated by a solid line, a double dot dashed line and a dotted line, respectively. In the aberration diagram of the astigmatism, an aberration in a sagittal direction and an aberration in a tangential direction are indicated by a solid line and a broken line, respectively. In the aberration diagram of the lateral chromatic aberration, an aberration for C-line (wavelength is 656.3 nm) and an aberration for F-line (wavelength is 486.1 nm) are indicated by a double dot dashed line and a dotted line, respectively. In the aberration diagram of the spherical aberration, Fno. represents an F-number. In the other aberration diagrams, ω means a half angle of view.

TABLE 1

EXAMPLE 1·LENS DATA

| SURFACE NUMBER | CURVATURE RADIUS | SURFACE DISTANCE | nd | vd |
|---|---|---|---|---|
| (PROJECTION SURFACE) | ∞ | 12.42 | | |
| 1 | 2.295 | 0.20 | 1.84670 | 23.8 |
| 2 | 12.291 | 0.08 | | |
| 3 | 1.384 | 0.19 | 1.62040 | 60.3 |
| 4 | 0.492 | 0.99 | | |
| 5 | −0.622 | 0.16 | 1.74080 | 27.8 |
| 6 | 3.544 | 0.01 | | |
| 7 | ∞ | 0.18 | 1.77250 | 49.6 |
| 8 | −0.946 | 0.02 | | |
| 9 | −4.388 | 0.16 | 1.49700 | 81.5 |
| 10 | −1.058 | 0.02 | | |
| 11 | 20.144 | 0.17 | 1.72920 | 54.7 |
| 12 | −1.363 | 1.52 | | |
| 13 | −20.682 | 0.18 | 1.72920 | 54.7 |
| 14 | −2.959 | 0.02 | | |
| 15 | 10.344 | 0.18 | 1.77250 | 49.6 |
| 16 | −3.829 | 0.05 | | |
| 17 | ∞ | 0.31 | 1.51630 | 64.1 |
| 18 | ∞ | 0.05 | | |
| 19 | ∞ | | | |

Figure 6:
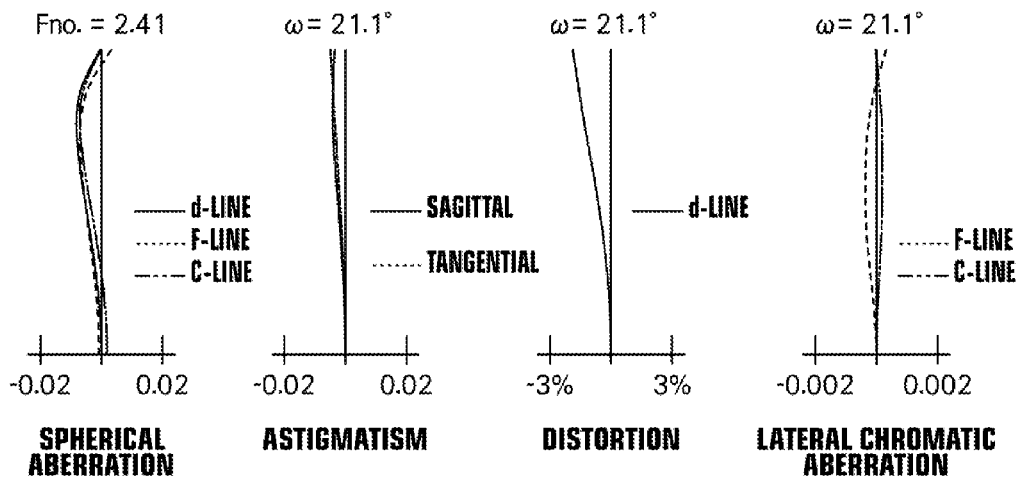
FIG. 6 is aberration diagrams of the projection lens in Example 2 of the present invention.

Next, a projection lens in Example 2 will be described. FIG. 2 is a cross section illustrating the lens configuration of the projection lens in Example 2. Table 2 shows lens data of the projection lens in Example 2. FIG. 6 illustrates aberration diagrams of the projection lens in Example 2.

TABLE 2

EXAMPLE 2·LENS DATA

| SURFACE NUMBER | CURVATURE RADIUS | SURFACE DISTANCE | nd | vd |
|---|---|---|---|---|
| (PROJECTION SURFACE) | ∞ | 12.32 | | |
| 1 | 2.438 | 0.21 | 1.90200 | 25.1 |
| 2 | 13.638 | 0.10 | | |
| 3 | 1.566 | 0.18 | 1.53780 | 74.7 |
| 4 | 0.489 | 1.02 | | |
| 5 | −0.616 | 0.16 | 1.76180 | 26.5 |
| 6 | 2.496 | 0.01 | | |
| 7 | 4.208 | 0.19 | 1.81600 | 46.6 |
| 8 | −0.943 | 0.02 | | |
| 9 | −2.951 | 0.15 | 1.61800 | 63.3 |
| 10 | −1.037 | 0.02 | | |
| 11 | 15.519 | 0.16 | 1.72920 | 54.7 |
| 12 | −1.702 | 1.40 | | |
| 13 | −10.268 | 0.19 | 1.72920 | 54.7 |
| 14 | −2.538 | 0.02 | | |
| 15 | 51.340 | 0.20 | 1.90270 | 31.0 |
| 16 | −3.022 | 0.04 | | |
| 17 | ∞ | 0.31 | 1.51630 | 64.1 |
| 18 | ∞ | 0.05 | | |
| 19 | ∞ | | | |

Figure 7:
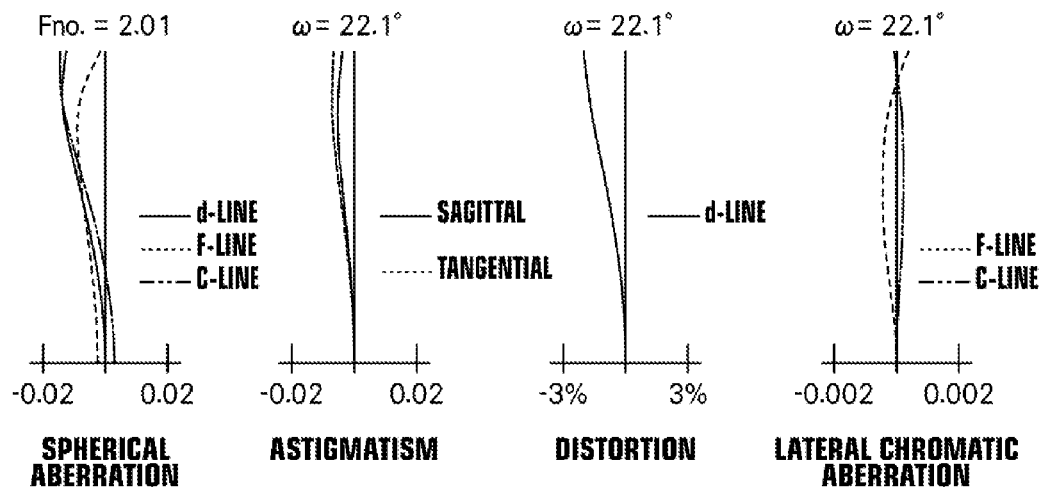
FIG. 7 is aberration diagrams of the projection lens in Example 3 of the present invention.

Next, a projection lens in Example 3 will be described. FIG. 3 is a cross section illustrating the lens configuration of the projection lens in Example 3. Table 3 shows lens data of the projection lens in Example 3. FIG. 7 illustrates aberration diagrams of the projection lens in Example 3.

TABLE 3

EXAMPLE 3·LENS DATA

| SURFACE NUMBER | CURVATURE RADIUS | SURFACE DISTANCE | nd | vd |
|---|---|---|---|---|
| (PROJECTION SURFACE) | ∞ | 16.19 | | |
| 1 | 3.999 | 0.25 | 1.90200 | 25.1 |
| 2 | 67.474 | 0.38 | | |
| 3 | 1.963 | 0.19 | 1.49700 | 81.5 |
| 4 | 0.514 | 1.24 | | |
| 5 | −0.679 | 0.09 | 1.90200 | 25.1 |
| 6 | 2.278 | 0.26 | 1.81600 | 46.6 |
| 7 | −0.781 | 0.02 | | |
| 8 | −4.968 | 0.13 | 1.88200 | 37.2 |
| 9 | −1.575 | 0.02 | | |
| 10 | 3.740 | 0.15 | 1.83480 | 42.7 |
| 11 | −7.891 | 1.42 | | |
| 12 | −7.194 | 0.20 | 1.72920 | 54.7 |
| 13 | −2.348 | 0.02 | | |
| 14 | −21.581 | 0.21 | 1.88200 | 37.2 |
| 15 | −2.583 | 0.02 | | |
| 16 | ∞ | 0.32 | 1.51630 | 64.1 |
| 17 | ∞ | 0.05 | | |
| 18 | ∞ | | | |

Figure 8:
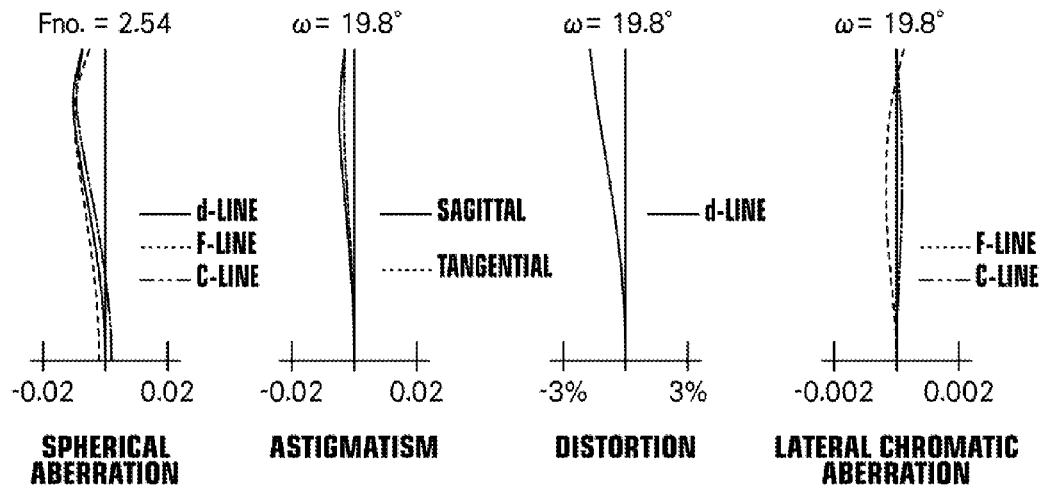
FIG. 8 is aberration diagrams of the projection lens in Example 4 of the present invention.

Next, a projection lens in Example 4 will be described. FIG. 4 is a cross section illustrating the lens configuration of the projection lens in Example 4. Table 4 shows lens data of the projection lens in Example 4. FIG. 8 illustrates aberration diagrams of the projection lens in Example 4.

TABLE 4

EXAMPLE 4·LENS DATA

| SURFACE NUMBER | CURVATURE RADIUS | SURFACE DISTANCE | nd | vd |
|---|---|---|---|---|
| (PROJECTION SURFACE) | ∞ | 9.65 | | |
| 1 | 1.987 | 0.26 | 1.80000 | 29.8 |
| 2 | 18.606 | 0.05 | | |
| 3 | 1.353 | 0.17 | 1.48750 | 70.2 |
| 4 | 0.460 | 0.83 | | |
| 5 | −0.377 | 0.08 | 1.69900 | 30.1 |
| 6 | 13.421 | 0.01 | | |
| 7 | −3.419 | 0.16 | 1.62040 | 60.3 |
| 8 | −0.551 | 0.01 | | |
| 9 | −2.574 | 0.15 | 1.62040 | 60.3 |
| 10 | −0.642 | 0.01 | | |
| 11 | 4.214 | 0.14 | 1.62040 | 60.3 |
| 12 | −2.439 | 1.20 | | |
| 13 | −8.041 | 0.18 | 1.71300 | 53.9 |
| 14 | −1.908 | 0.01 | | |
| 15 | −48.247 | 0.19 | 1.71300 | 53.9 |
| 16 | −2.051 | 0.04 | | |
| 17 | ∞ | 0.29 | 1.51630 | 64.0 |
| 18 | ∞ | 0.05 | | |
| 19 | ∞ | | | |

Table 5 shows values corresponding to conditional expressions (1) through (11) for the projection lenses in Examples 1 through 4. In all of the examples, d-line is a reference wavelength. The following Table 5 shows values at this reference wavelength.

TABLE 5

| EXPRESSION NUMBER | CONDITIONAL EXPRESSION | EXAMPLE 1 | EXAMPLE 2 | EXAMPLE 3 | EXAMPLE 4 |
|---|---|---|---|---|---|
| (1) | $\|R1b/R1f\| \leq 0.5$ | 0.14 | 0.25 | 0.33 | 0.24 |
| (2) | $\|R2b/R2f\| \leq 0.6$ | 0.37 | 0.06 | 0.12 | 0.04 |
| (3) | $\|\Delta/f2\| \leq 0.3$ | 0.19 | 0.16 | 0.17 | 0.15 |
| (4) | $d2/f2 \leq 0.4$ | 0.18 | 0.21 | 0.21 | 0.24 |
| (5) | $0.0 \leq R1b/R1f \leq 0.5$ | 0.14 | 0.25 | 0.33 | 0.24 |
| (6) | $-0.6 \leq R2b/R2f \leq 0.4$ | -0.37 | -0.06 | 0.12 | 0.04 |
| (7) | $R1f/R2f \leq 0.6$ | -2.00 | -0.20 | 0.33 | 0.17 |
| (8) | $0.9 \leq f2/f \leq 3.5$ | 2.07 | 1.89 | 1.96 | 1.63 |
| (9) | $0.2 \leq dd/f \leq 0.5$ | 0.37 | 0.35 | 0.31 | 0.35 |
| (10) | $Bf/f \leq 0.35$ | 0.23 | 0.23 | 0.23 | 0.18 |
| (11) | $1.7 \leq N2$ | 1.73, 1.77 | 1.73, 1.90 | 1.73, 1.88 | 1.71, 1.71 |

As these data show, all of the projection lenses in Examples 1 through 4 satisfy conditional expressions (1) through (11). It is recognizable that stray light is small, and curvature of field is also small in the projection lenses while the size of the projection lenses is small.

Figure 9:
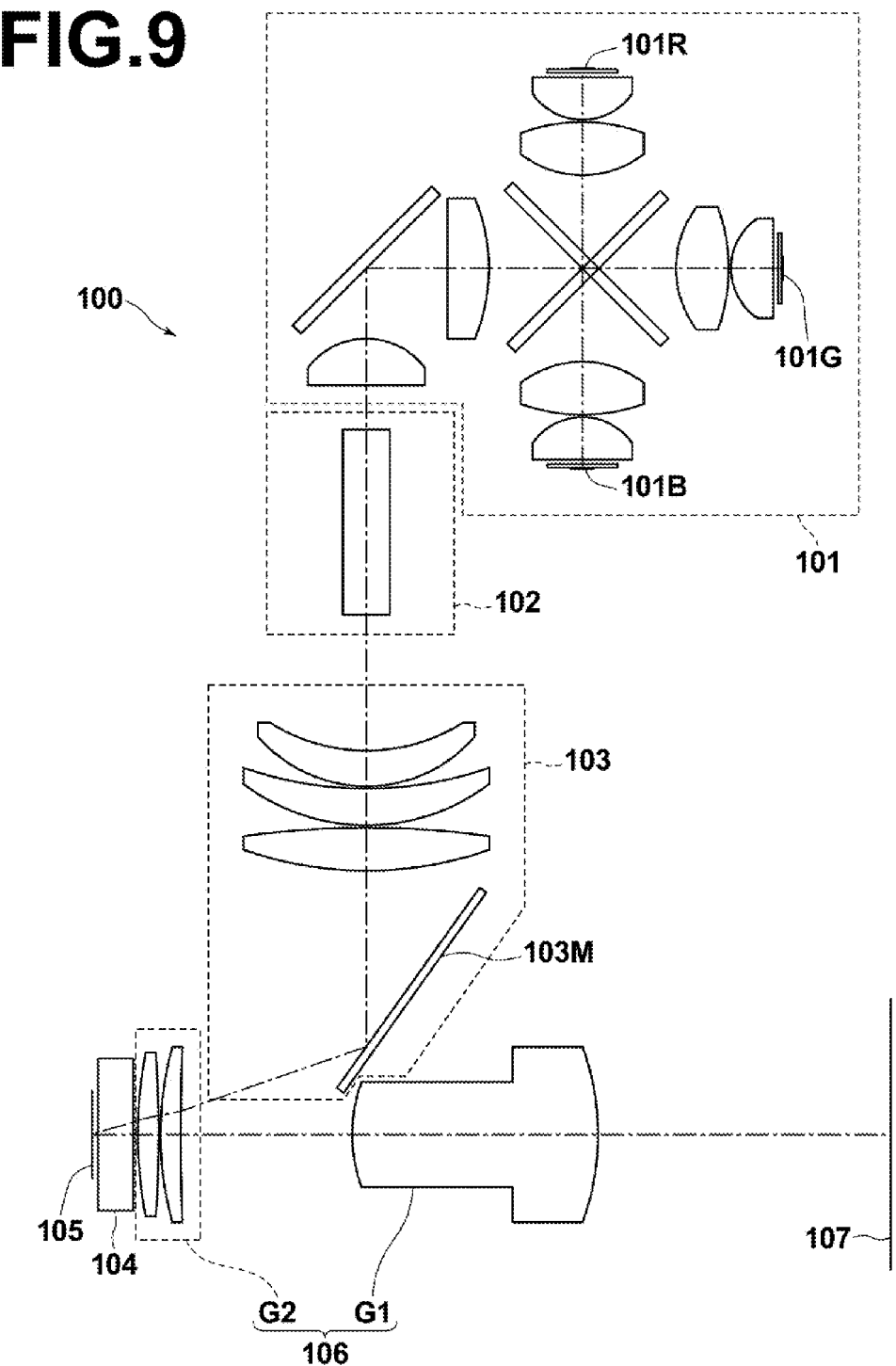
FIG. 9 is a schematic diagram illustrating the configuration of a projection-type display apparatus according to an embodiment of the present invention.

Next, with reference to FIG. 9, a projection-type display apparatus according to an embodiment of the present invention will be described. FIG. 9 is a schematic diagram illustrating the configuration of a projection-type display apparatus 100 according to an embodiment of the present invention. This projection-type display apparatus 100 includes a light source unit 101, an integrator unit 102, an illumination optical system unit 103, a parallel-flat-plate-shaped optical member 104, which is assumed to be various filters, a cover glass or the like, a DMD 105, as a light valve, and a projection lens 106 according to an embodiment of the present invention.

Light of three primary colors (R, G, B) output from light sources 101R, 101G and 101B, respectively, is sequentially output from the light source unit 101 by time division. The distribution of the light amount of rays output from the light source unit 101 is made uniform at a cross section perpendicular to an optical axis by the integrator unit 102. Further, the rays are reflected by mirror 103M in the illumination optical system unit 103, and illuminate the DMD 105. At this time, light output from the illumination optical system 103 passes through second lens group G2, which functions as a field lens of the projection lens 106, and enters the DMD 105. In the DMD 105, modulation is switched, based on a change in the color of incident light, to perform modulation for the color of incident light. The light that has been optically modulated by the DMD 105 enters the projection lens 106. The projection lens 106 projects an optical image of light that has been optically modulated by the DMD 105 onto a screen 107.

Here, other kinds of light valve may be used instead of the DMD 105. For example, a transmissive liquid crystal display device or a reflective liquid crystal display device may be used as the light valve.

So far, the present invention has been described by using embodiments and examples. However, the present invention is not limited to the aforementioned embodiments nor examples, and various modifications are possible. For example, the values of a curvature radius, a distance between surfaces, a refractive index and an Abbe number of each lens element are not limited to the values in the aforementioned numerical value examples, and may be other values.

Further, the projection-type display apparatus of the present invention is not limited to the apparatus configured as described above. For example, the light valve used in the apparatus and an optical member used to separate rays or combine rays are not limited to the aforementioned configuration, and various modifications of the mode are possible.

What is claimed is:

1. A projection lens consisting essentially of:
a first lens group having positive refractive power; and
a second lens group having positive refractive power in this order from a magnification side,
wherein a surface closest to a reduction side in the first lens group is convex, and
wherein the second lens group consists of two single lenses each having positive refractive power, and in each of which a surface having a smaller absolute value of a curvature radius faces the reduction side, and
wherein the following conditional expressions (1) through (4) are satisfied:

$$|R1b/R1f| \leq 0.5 \tag{1}$$

$$|R2b/R2f| \leq 0.6 \tag{2}$$

$$|\Delta/f2| \leq 0.3 \tag{3; and}$$

$$d2/f2 \leq 0.4 \tag{4}$$

where

R1b: a curvature radius of a reduction-side surface of the positive lens located toward the magnification side in the second lens group, R1f: a curvature radius of a magnification-side surface of the positive lens located toward the magnification side in the second lens group, R2b: a curvature radius of a reduction-side surface of the positive lens located toward the reduction side in the second lens group, R2f: a curvature radius of a magnification-side surface of the positive lens located toward the reduction side in the second lens group, Δ: a distance between a lens surface closest to the reduction side in the first lens group and a magnification-side focal position of the second lens group, f2: a focal length of the whole second lens group, and d2: the total length of the second lens group.

2. The projection lens, as defined in claim 1, wherein the following conditional expressions (5) and (6) are satisfied:

$$0.0 \leq R1b/R1f \leq 0.5 \tag{5; and}$$

$$-0.6 \leq R2b/R2f \leq 0.4 \tag{6}$$

3. The projection lens, as defined in claim 2, wherein the following conditional expression (5-1) is satisfied:

$$0.1 \leq R1b/R1f \leq 0.5 \tag{5-1}$$

4. The projection lens, as defined in claim 2, wherein the following conditional expression (6-1) is satisfied:

$$-0.5 \leq R2b/R2f \leq 0.3 \qquad (6\text{-}1).$$

5. The projection lens, as defined in claim 1, wherein the following conditional expression (7) is satisfied:

$$R1f/R2f \leq 0.6 \qquad (7).$$

6. The projection lens, as defined in claim 1, wherein the following conditional expression (8) is satisfied:

$$0.9 \leq f2/f \leq 3.5 \qquad (8), \text{ where}$$

f: a focal length of an entire system.

7. The projection lens, as defined in claim 1, wherein the following conditional expression (9) is satisfied:

$$0.2 \leq dd/l \leq 0.5 \qquad (9), \text{ where}$$

dd: a distance between the first lens group and the second lens group, and
l: the total length of an entire system.

8. The projection lens, as defined in claim 1, wherein the following conditional expression (10) is satisfied:

$$Bf/f \leq 0.35 \qquad (10), \text{ where}$$

Bf: a back focus of an entire system, and
f: a focal length of the entire system.

9. The projection lens, as defined in claim 1, wherein the following conditional expression (11) is satisfied:

$$1.7 \leq N2 \qquad (11), \text{ where}$$

N2: a refractive index of each lens constituting the second lens group.

10. The projection lens, as defined in claim 1, wherein the first lens group consists essentially of:

a first lens having positive refractive power;
a second lens having negative refractive power;
a third lens having negative refractive power;
a fourth lens having positive refractive power;
a fifth lens having positive refractive power; and
a sixth lens having positive refractive power in this order from the magnification side.

11. The projection lens, as defined in claim 10, wherein the third lens and the fourth lens are cemented together.

12. The projection lens, as defined in claim 1, wherein the following conditional expression (4-1) is satisfied:

$$d2/f2 \leq 0.3 \qquad (4\text{-}1).$$

13. The projection lens, as defined in claim 1, wherein the following conditional expression (7-1) is satisfied:

$$-3.0 \leq R1f/R2f \leq 0.5 \qquad (7\text{-}1).$$

14. The projection lens, as defined in claim 1, wherein the following conditional expression (8-1) is satisfied:

$$1.2 \leq f2/f \leq 3.0 \qquad (8\text{-}1), \text{ where}$$

f: a focal length of an entire system.

15. A projection-type display apparatus comprising:

a light source;
a light valve, which light from the light source enters; and
the projection lens as defined in claim 1, as a projection lens that projects an optical image formed by light that has been optically modulated by the light valve onto a screen,
wherein also the light entering the light valve passes through the second lens group before the light enters the light valve.

* * * * *